(12) United States Patent
Gutierrez Montes et al.

(10) Patent No.: US 11,570,984 B2
(45) Date of Patent: Feb. 7, 2023

(54) METHOD FOR ORGAN CHIMERIZATION THROUGH CELLULAR TREATMENT

(71) Applicant: UNIVERSIDAD DEL VALLE, Cali (CO)

(72) Inventors: Jose Oscar Gutierrez Montes, Cali (CO); Alejandra Maria Jerez Valderrama, Cali (CO); Jaime Alfonso Muñoz Botina, Cali (CO)

(73) Assignee: Universidad del Valle, Cali (CO)

( * ) Notice: Subject to any disclaimer, the term of this patent is extended or adjusted under 35 U.S.C. 154(b) by 1231 days.

(21) Appl. No.: 15/826,339

(22) Filed: Nov. 29, 2017

(65) Prior Publication Data

US 2018/0146661 A1    May 31, 2018

Related U.S. Application Data

(63) Continuation-in-part of application No. 15/823,630, filed on Nov. 28, 2017, now Pat. No. 10,602,741.

(30) Foreign Application Priority Data

Nov. 28, 2016   (CO) .................... NC2016/0004700
Dec. 1, 2016    (CO) .................... NC2016/0004900

(51) Int. Cl.
    *A01N 1/02*    (2006.01)
(52) U.S. Cl.
    CPC ......... *A01N 1/0247* (2013.01); *A01N 1/0226* (2013.01); *A01N 1/0284* (2013.01)
(58) Field of Classification Search
    None
    See application file for complete search history.

(56) References Cited

U.S. PATENT DOCUMENTS

| | | | |
|---|---|---|---|
| 6,046,046 A | | 4/2000 | Hassanein |
| 6,569,615 B1* | | 5/2003 | Thatte ...................... A01N 1/02 435/1.1 |
| 6,899,850 B2 | | 5/2005 | Haywood et al. |
| 7,811,808 B2 | | 10/2010 | Plaats et al. |
| 2004/0224299 A1 | | 11/2004 | Garland et al. |
| 2005/0015327 A1 | | 1/2005 | Eshet et al. |
| 2005/0032122 A1* | | 2/2005 | Hwang ................ C12N 5/0647 435/7.1 |
| 2005/0260748 A1* | | 11/2005 | Chang .................. C12N 5/0672 435/366 |
| 2007/0082394 A1* | | 4/2007 | Moscatello .......... C12N 5/0667 435/325 |
| 2007/0178018 A1 | | 8/2007 | Virno |
| 2009/0197325 A1 | | 8/2009 | Fishman et al. |
| 2011/0076666 A1 | | 3/2011 | Brassil |
| 2011/0294108 A1 | | 12/2011 | Argoudelis et al. |
| 2012/0292320 A1 | | 11/2012 | Judson et al. |
| 2014/0234905 A1* | | 8/2014 | Pla ....................... C12N 5/0037 435/69.6 |

FOREIGN PATENT DOCUMENTS

| | | |
|---|---|---|
| EP | 2179648 A1 | 4/2010 |
| WO | 1991003934 A1 | 4/1991 |

OTHER PUBLICATIONS

Office Action, Co-pending U.S. Appl. No. 15/823,630, dated Mar. 13, 2019.
Chavatte, Arnaud, English language machine translation of document EP2179648A1 (Year 2010).
Office Action—Co-pending U.S. Appl. No. 15/823,630.
Notice of Allowance, related co-pending U.S. Appl. No. 15/823,630.
Office Action, Co-pending U.S. Appl. No. 15/823,630, filed Aug. 7, 2019.

* cited by examiner

*Primary Examiner* — Blaine Lankford
(74) *Attorney, Agent, or Firm* — The Morales Law Firm; Joseph L. Morales, Esq.

(57) ABSTRACT

A method for organ and tissue chimerization using bone marrow cellular treatment, which avoids rejection of transplanted organs and diminishes or suspends the use of immunosuppressant drugs in patients subjected to transplant procedures. The method comprises washing the organ in an electrolyte solution. A further step of washing the organ in a wash solution. The organ is then placed in a culture solution and incubated with bone marrow cells.

20 Claims, 2 Drawing Sheets ary applications, which claims priority from Colombian application serial number NC2016/0004700 filed on Nov. 28, 2016. Colombian Application NC2016/0004700, Colombian Application NC2016/0004900, and U.S. application Ser. No. 15/823,630; are incorporated herein by reference in their entirety.

METHOD FOR ORGAN CHIMERIZATION THROUGH CELLULAR TREATMENT

CROSS-REFERENCE TO RELATED APPLICATIONS

This application claims priority from Colombian application serial number NC2016/0004900 filed on Dec. 1, 2016, and U.S. application Ser. No. 15/823,630, filed on Nov. 28, 2017, which claims priority from Colombian application serial number NC2016/0004700 filed on Nov. 28, 2016. Colombian Application NC2016/0004700, Colombian Application NC2016/0004900, and U.S. application Ser. No. 15/823,630; are incorporated herein by reference in their entirety.

BACKGROUND

Field of the Invention

The present procedure relates to the field of conservation of tissues. More specifically to a method for the preservation of human tissue, animal tissue, and live organs.

Background of the Invention

When an organ stops functioning in a patient, a functional organ must replace it. That requires a procedure known as organ transplant. However, the procedure faces the possibility of rejection by the receptor of the implanted organ because the immune system reacts to everything foreign to the body (virus, bacteria, cells, etc.). In the state-of-the-technique, diverse types of methods exist that are implemented to overcome reactions presented by the immune system of patients subjected to organ transplant procedures.

Transplants seek to overcome the immune system and this has now been achieved through three ways:
a) Matching
b) Non-specific immunosuppression
c) induction of transplant tolerance Matching is the most-used route and with higher probabilities of success. For example, if a person needs a transplant and has a numerous family, specifically siblings, a fourth of those siblings could have the same profile of human leucocyte antigens, which is the most important antigen system to determine if a transplant will be compatible or not. Under these circumstances, low immunosuppression is needed and organ grafts will be accepted in the long term with very good outcomes. However, matching is only applicable in organs that can be transplanted without affecting the donor's life, as is the case of kidney or bone marrow. Unfortunately, most transplants must be performed from unmatched donors.

The second method (non-specific immunosuppression) centers on overcoming the immunological barrier. This is accomplished with non-specific immunosuppressive drugs, which have been a key element in the field of organ transplants during the last three decades. These drugs include steroids, antimetabolites, and monoclonal antibodies. Although not specific, they have the selectivity to modify the behavior of T cells in the immune system and, due to this, are particularly useful for suppressing immune response against transplants. However, upon diminishing the immune response, the transplant patient has greater susceptibility of developing infections and malignancies. Further, even with the best specific immunosuppressant drugs, there is an inexorable loss of grafts, close to 7% per year, due to chronic rejection.

The third method, induction of transplant tolerance, is defined as the lack of specific immune system response against an antigen, whether its own or foreign, induced by prior contact with said antigen. Induction of tolerance consists in previously exposing the patient to hematopoietic stem cells from the donor and then transplanting the organ.

This technique has had variable outcomes in patients who have previously received bone marrow transplant and then were transplanted a different organ from the same donor of the bone marrow cells. However, it has not been possible to apply this technique to other types of patients.

In medicine, «chimera» denominates the organism formed by cells from different individuals. Its formation has been described as a spontaneous event in scenarios, like the onset of gestation, organ transplant, or transfusion. The in vitro method for chimera formation has been denominated chimerization, a process that seeks to transfer to the organ the genomic identity of the receptor.

In chimerization, the genetic information contained in the receptor's stem cells are transmitted to the tissue or organ for transplant, to diminish the probability of rejection and the use immunosuppressant drugs, which are medications that make the human organism diminish the production of antibodies to prevent rejection of transplanted organs but that can have collateral effects on the organism receiving the transplanted organ.

In the field of patents related to chimerization processes, Chinese application CN1576364 discloses a long-term heterogeneous method for skin transplant through heterogeneous measured cells for tolerance formation. U.S. Pat. No. 7,892,578B2 discloses a procedure to treat hematological disorders, both in neoplastic (hematological cancers) and in non-neoplastic conditions, through the induction of mixed chimerization using myelo-reductive cells.

SUMMARY

A method for in-vitro chimerization for organ transplants. One step of the method comprises washing an organ for transplant with an electrolytic solution in a container. As subsequent step comprises replacing the electrolytic solution with wash media, comprising Hanks' balanced salt solution (HBSS) without phenol red; Roswell Park Memorial Institute medium (RPMI) 1640 medium without phenol red; glutamate; sodium pyruvate; bovine albumin or peptone; vitamin C; N-acetylcysteine; nicotinamide; penicillin/streptomycin; amphotericin B. A further step comprises replacing the wash media with culture media comprising RPMI 1640 medium without phenol red; glutamate; sodium pyruvate; bovine albumin or peptone; vitamin C; N-acetylcysteine; nicotinamide; penicillin/streptomycin; amphotericin B. Another step comprises adding fresh culture media with bone marrow cells obtained from a receptor to the culture media, which coats the organ with the bone marrow cells.

The organ is incubated with the bone marrow cells for four to six hours. In some embodiments, oxygenation is maintained at 100% throughout all steps. The wash and culture media are pumped through the organ at a rate of 15 to 75 ml/min in some embodiments. The container is maintained at a temperature of between 2° C. and 4° C. prior to addition of bone marrow cells. The temperature is raised to between 30° C. and 33° C. once the bone marrow cells are added.

Another embodiment provides a solution for in-vitro washing of an organ for transplant. The solution comprises Hank's balanced salt solution (HBSS) without phenol red; RPMI 1640 medium without phenol red; glutamate; sodium pyruvate; bovine albumin or Peptone; a vitamin; an amino acid; an antibiotic; and an antifungal agent. In an embodiment, the vitamin is selected from the group consisting of vitamin C, nicotinamide, and mixtures thereof. The antibiotic is selected from the group of beta-lactamic antibiotics (such as penicillin), aminoglycosides antibiotics (such as streptomycin), fluoroquinolones antibiotics, or combinations thereof. The antifungal agent is selected from the Polyene (such as amphotericin), Imidazole, triazole, thiazole, and Echinocandins antifungals, or combinations thereof. In one embodiment, the solution comprises Hank's balanced salt solution (HBSS) without phenol red; RPMI 1640 medium without phenol red; glutamate; sodium pyruvate; bovine albumin or peptone; vitamin C; N-acetylcysteine; nicotinamide; penicillin/streptomycin; amphotericin B. In a further embodiment, the Hank's balanced salt solution (HBSS) without phenol red is a 1× solution; RPMI 1640 medium without phenol red is a 1× solution; glutamate with a concentration of 1-2×; sodium pyruvate with a concentration of 1-2 mM; bovine albumin or peptone with a concentration of 0.125-0.375%; vitamin C at a concentration of 0.25-0.50 mg/ml; N-acetylcysteine at a concentration of 0.04-0.08%; nicotinamide 0.25-0.50 mg/mL; penicillin (at a concentration of 100,000 U/L)/streptomycin (at a concentration of 100,000 µg/L); amphotericin B at a concentration of 750 µg/L.

Another embodiment comprises a solution for in-vitro culture for organ. The culture solution comprises RPMI 1640 medium without phenol red; glutamate; sodium pyruvate peptone; a vitamin; N-acetylcysteine; nicotinamide; and an antifungal agent. In one embodiment, the vitamin is vitamin C. In another embodiment, the antibiotic is at least one of penicillin, streptomycin, and mixtures thereof. The antifungal agent is amphotericin B in another embodiment. In some embodiments, RPMI 1640 medium without phenol red is at a 1× concentration; glutamate with a concentration of 1-2×; sodium pyruvate with a concentration of 1-2 mM; bovine albumin or peptone with a concentration of 0.125-0.375%; vitamin C at a concentration of 0.25-0.50 mg/ml; N-acetylcysteine at a concentration of 0.04-0.08%; nicotinamide 0.25-0.50 mg/mL; penicillin/streptomycin at a concentration of 100,000 U/L/100,000 µg/L; amphotericin B at a concentration of 750 µg/L.

BRIEF DESCRIPTION OF THE DRAWINGS

The above and other features, aspects, and advantages of the chimerization method described in this application are considered in more detail, in relation to the following description of embodiments thereof shown in the accompanying drawings, in which.

DETAILED DESCRIPTION OF THE INVENTION

In one embodiment, we disclose a procedure for human organ and tissue chimerization through cellular treatment prior to transplant procedures, which avoids rejection of transplanted organs and diminishes or suspends the use of immunosuppressant drugs in patients subjected to transplant procedures.

The present method achieves chimerization through cellular treatment of the organ prior to transplantation. The success of the process is determined through the evaluation of the microsatellite profiles (STRs) of the donor and receptor genomes, to identify a combination of these unique profiles in the chimerized organ, until identifying 100% of the receptor's genome. This method seeks to avoid activation of the immune system due to the organ transplant and, hence, reduce or eliminate the use of immunosuppressant medications, yielding as a result better quality of life for the patient.

This method was developed in the In-Vitro Cell Culture laboratory of the Department of Pharmacology at Universidad del Valle in Cali, Colombia. The organ for transplant is kept under adequate conditions of temperature, humidity, and oxygenation. The organ is washed to remove blood cells from the donor and, thereafter, the organ is cultured in the presence of bone marrow stem cells from the receptor in a culture medium comprised of vital nutrients and growth factors to then be transplanted in the receptor patient.

Figure 1:
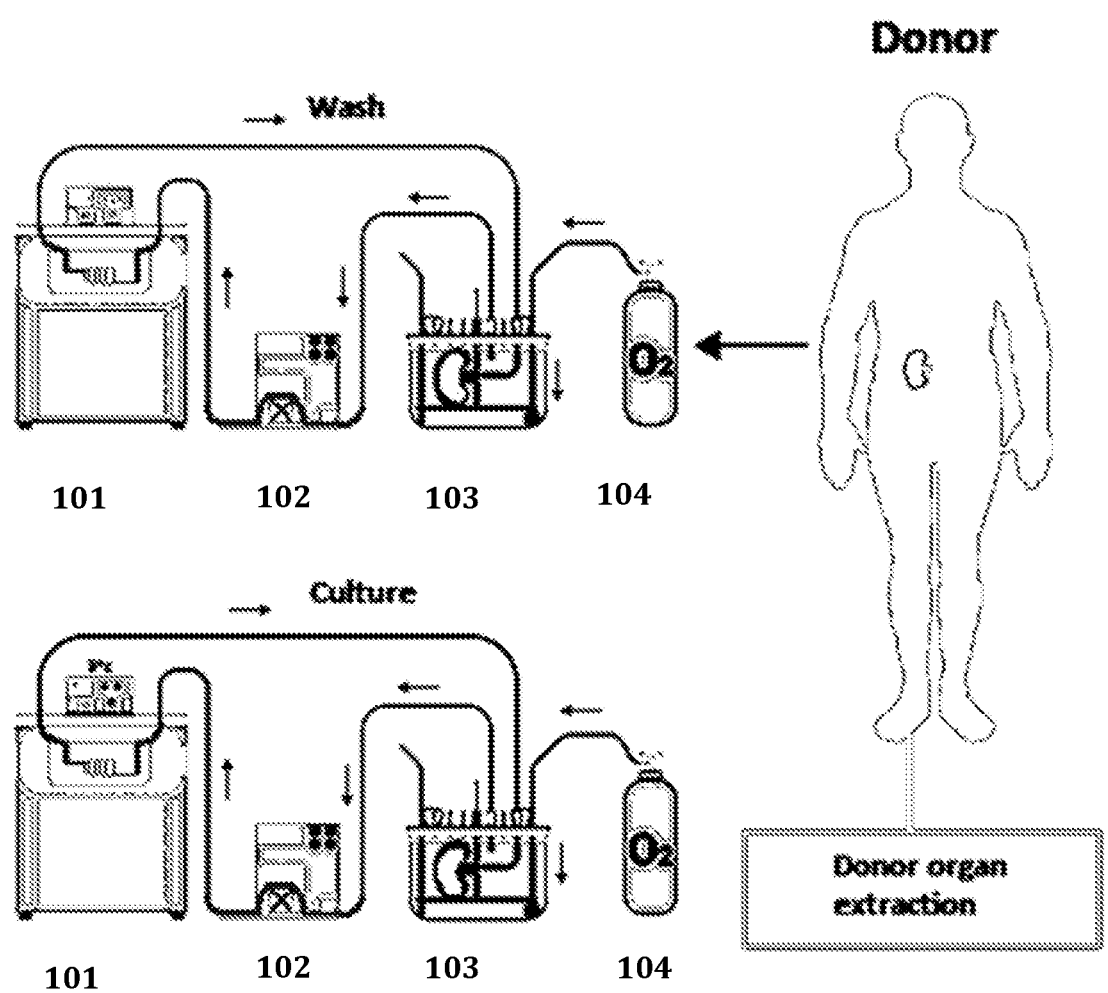
FIG. 1 is a schematic representation of the extraction and preparation of the organ for transplantation.

In accordance with one embodiment, as shown in FIG. 1, the organ that will be used for chimerization and transplant is removed from the donor and prepared for transport and transplant to the recipient. As described in more detail below, the organ is removed from the donor and placed in a transfer device (103). The transfer device (103) is connected to an oxygen tank (104) or any other device that is used to maintain high oxygen levels of the organ. In some embodiments, a peristaltic pump (102) is connected to the transfer device (103) to recirculate a solution that maintains the organ in proper condition for transplantation. The peristaltic pump (102) may be connected to a heat pump (101), which maintains the temperature of the solution as desired.

Figure 2:
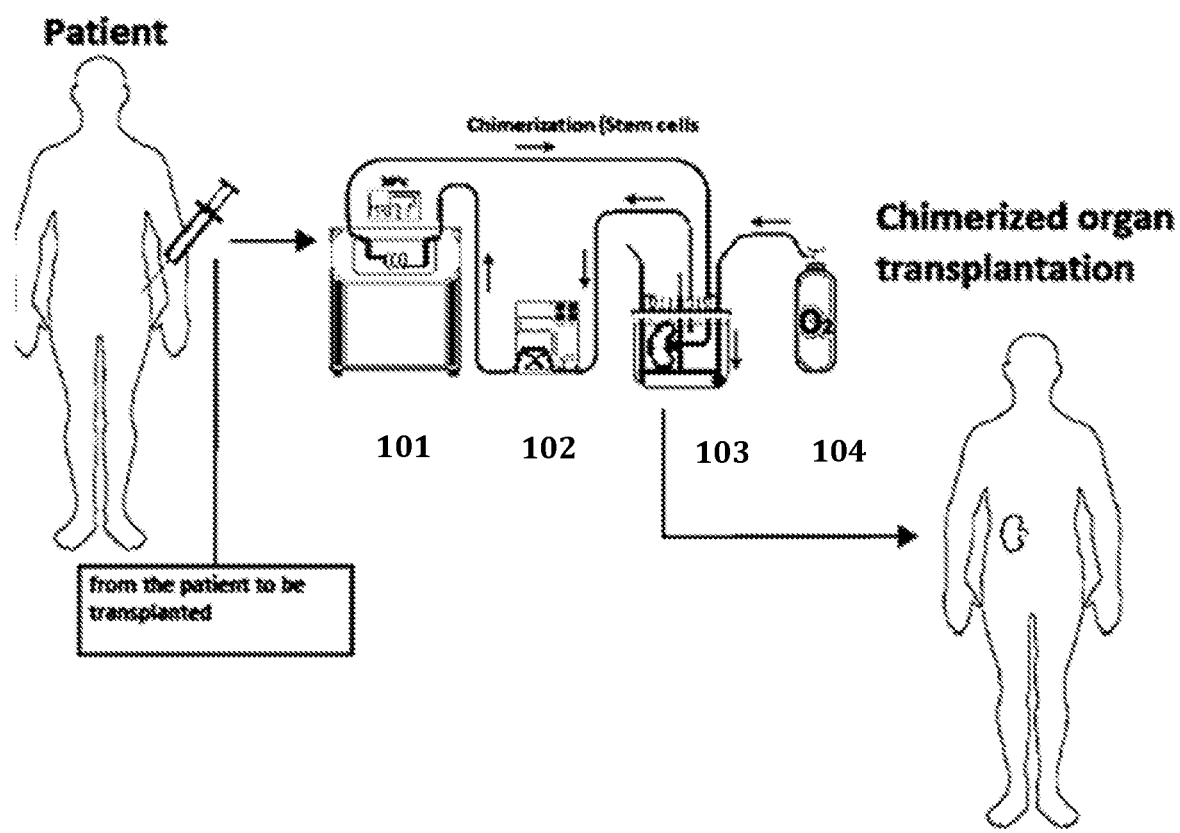
FIG. 2 is a schematic representation of the chimerization and transplantation of the organ into the patient.

In a preliminary step of the method, bone marrow cells from the patient are harvested. Bone marrow cells are characterized for being pluripotent, this means these cells can be differentiated into a vast variety of cell lines, which turns them into the first election to carry out these types of procedures. A hematologist in an operating room under strict asepsis conditions and general anesthesia performs extraction of bone marrow cells. The procedure takes place 24 hours before the chimerization process, storing the sample transfer bags (TERUFLEX Blood Bags®), it is contemplated that any suitable aseptic transfer container for the organ may be used. With aspiration, stem cells and other blood progenitor cells are collected. Bone marrow is obtained at an approximate volume from 25 to 50 mL. This step is shown in FIG. 2, as explained above, this step can be conducted at least 24 hours prior to chimerization. In some embodiments, the bone marrow cells can be collected and stored for several days as understood by a person of ordinary skill in the art. In some embodiments, the bone marrow cells can be stored for up to 45 days utilizing anticoagulants, such as citrate phosphate dextrose adenine (CPDA-1), or other cell preservation additives as recognized by a person of ordinary skill in the art.

In one step, the media for the organ chimerization procedure is prepared. A balanced electrolytic solution designed for maintenance of organs is prepared. The balanced electrolytic solution can include, for example, sodium chloride; potassium chloride;

monopotassium a-ketoglutaric acid; hexahydrate magnesium chloride; L-histidine hydrochloride monohydrate; L-histidine; L-tryptophan; mannitol. It is contemplated that additional elements may be added to the solution as understood by a person of ordinary skill in the art.

In one embodiment, the electrolytic solution consists of the following elements: sodium chloride 0.8766 g (15 mMol); potassium chloride 0.6710 g (9 mMol); monopotassium a-ketoglutaric acid 0.1842 g (1 mMol); hexahydrate magnesium chloride 0.8132 g (4 mMol); L-histidine hydrochloride monohydrate 3.7733 g (18 mMol); L-histidine 27.9289 g (180 mMol); L-tryptophan 0.4085 (2 mMol); mannitol 5.4651 g (30 mMol); dehydrated calcium chloride 0.0022 g (0.015 mMol); in a total volume of 1000 mL. A person of ordinary skill in the art would understand that the volume can be adjusted utilizing dd$H_2$O and deionized $H_2$O. This solution can be prepared from the compounds mentioned, or acquired with the commercial names of: HenRoss, Perfadex, Wisconsin, Custodiol, etc.

A wash medium for the organ object of chimerization, in some embodiments, comprises a solution for in-vitro washing of an organ for transplant, comprising Hank's balanced salt solution (HBSS, PBS or any other phosphate buffered saline solutions) without phenol red, which allows to visually measure the pH change in the solution to maintain the appropriate pH between 7.2- to 7.4; RPMI medium (e.g., RPMI 1640) without phenol red; glutamate; sodium pyruvate; bovine albumin and/or peptone; a vitamin (such as Vitamin C, Vitamin E, and Vitamin B); an amino acid; an antibiotic; and an antifungal agent. In a further embodiment, the wash medium comprises HBSS without phenol red; Roswell Park Memorial Institute medium (commonly known as RPMI) without phenol red; Glutamate; Sodium pyruvate; Bovine albumin and/or peptone; vitamin C (or any other vitamin with known antioxidant effects, such as Vitamin E and Vitamin B); N-acetylcysteine (or a similar amino acid derivative); nicotinamide; penicillin/Streptomycin; Amphotericin B. In one preferred embodiment the wash medium comprises HBSS without phenol red (1×); RPMI without phenol red (1×); glutamate with a concentration of 1-2×; sodium pyruvate with a concentration of 1-2 mM; bovine albumin or peptone with a concentration of 0.125-0.375%; vitamin C at a concentration of 0.25-0.50 mg/ml; N-acetylcysteine at a concentration of 0.04-0.08%; nicotinamide 0.25-0.50 mg/mL; penicillin (at a concentration of 100,000 U/L)/streptomycin (at a concentration of 100,000 µg/L); amphotericin B at a concentration of 750 µg/L. The antibiotic is selected from the group of beta-lactamic antibiotics, aminoglycosides antibiotics, fluoroquinolones antibiotics, or combinations thereof. The antifungal agent is selected from the Polyene, Imidazole, Triazole, Thiazole, and Echinocandins antifungals, or combinations thereof. A person of ordinary skill would understand that other components of the solution may be utilized.

In one embodiment, a cultured media comprises RPMI without phenol red; glutamate; Sodium pyruvate; Peptone; vitamin C; N-acetylcysteine; nicotinamide; penicillin/streptomycin; and Amphotericin B. A person of ordinary skill in the art would recognize that other components may be utilized. In one embodiment, the cultured medium comprises RPMI without phenol red (1×); glutamate with a concentration of 1-2×; sodium pyruvate with a concentration of 1-2 mM; bovine albumin or peptone with a concentration of 0.125-0.375%; vitamin C at a concentration of 0.25-0.50 mg/ml; N-acetylcysteine at a concentration of 0.04-0.08%; nicotinamide 0.25-0.50 mg/mL; penicillin (a concentration of 100,000 U/L)/streptomycin (at a concentration of 100,000 µg/L); amphotericin B at a concentration of 750 µg/L. The antibiotic is selected from the group of beta-lactamic antibiotics, aminoglycosides antibiotics, fluoroquinolones antibiotics, or combinations thereof. The antifungal agent is selected from the Polyene, Imidazole, Triazole, Thiazole, and Echinocandins antifungals, or combinations thereof.

The organ for transplant is washed in situ with the wash medium described above prior to removing the organ from the body, i.e., explanting, to extract all cellular remains of white and red lines of the vascular system. The main artery of the organ is connected to a cannula connector and packaged in the operating room to be sent to the organ-processing laboratory, under suitable sterility and refrigeration conditions. The organ is packed in a biosecurity chamber in an sterile environment. A biosecurity chamber can include a laminar flow chamber. It may also include any other suitable sterile carrier. In some embodiments, no circulation of washing/culture medium is used, provided the ischemia time is a reasonable one, according to the organ processed. A person of ordinary skill in the art would recognize that there are various lengths of time depending on the organ. For example, lungs have a typical time of about six hours, and a maximum time of ten hours. The heart has a typical time of about four hours and a maximum time of ten hours. The intestines have a typical time of about seven hours and a maximum of thirteen hours. The pancreas has a typical time of fourteen hours and a maximum time of about twenty-four hours. The liver has a typical time of about seven hours and a maximum time of about eighteen hours. Kidneys have a long storage life of between nineteen and thirty-six hours.

Once in the laboratory, the organ is removed from the transport bag inside the biosecurity chamber in sterile environment. The chimerization method has three steps: washing, culture/maintenance in nutritional medium, and chimerization through co-culture with bone marrow stem cells from the patient receiving the transplant.

The organ is then placed in a container suitable for the organ's size, such as a glass or plastic biocompatible sterile container. The container can be made of any medical grade PVC, Polyethylene, PEEK, Polycarbonate, Ulltem PEI, Polysulfone, Polypropylene and polyurethane. The container is filled with the wash solution covering the organ. The glass container is connected to a heat exchanger with two ends, as shown in FIGS. 1 and 2. One end is connected to the organ's cannulated artery; the other end goes through a hydraulic system that maintains constant flow within the hose connected to the glass container holding the wash solution. The organ remains submerged in the wash solution throughout the process.

The organ is washed in the electrolytic solution. In one embodiment, the perfusion flow volume of the peristaltic pump at a rate of between 15 and 75 ml/min, depending on the organ. The flow rate in some embodiments is related to the normal flow rate in the human body, for example, the flow rate of blood for a heart is 0.2 L/min, a liver is 1.35 L/min, a kidney is 1.0 L/min. The system is maintained at a temperature of between 2° C. and 4° C. using a heat exchanger. In some embodiments, the preferred temperature is 2° C. and 4° C. Additionally, an aerator constantly supplies oxygen during the whole process, to obtain 100% saturation. The container is connected to a heat exchanger, such as a spiral heat exchanger, which on the other end is connected with another silicone plastic hose to a peristaltic pump that regulates the flow of the solution in which the organ is embedded. The wash perfusion time lasts approximately 2 to 3 hours. In some embodiments, the wash perfusion time is 2 hours.

The electrolytic solution is extracted from the container containing the organ and replaced with the wash media. The wash media is introduced at an approximate perfusion volume from 15 to 75 ml/min, depending on the organ. The organ is oxygenated to maintain 100% saturation throughout the process. Time of washing perfusion and maintenance of approximately 2 hours in some embodiments.

The wash solution is extracted from the container containing the organ and replaced with the culture media. The culture media is introduced at an approximate perfusion volume from 15 to 75 ml/min, depending on the organ. The organ is oxygenated to maintain 100% saturation throughout the process. Time of culture media perfusion and maintenance is of approximately 12 hours in some embodiments. It is understood that the culture media perfusion time can range between 2 and 12 hours.

In a subsequent step, the culture media is removed from the container. The culture media is replaced with fresh culture media, adding the bone marrow cells, (10,000 cells/mL). The bone marrow cells obtained from the patient (receptor) are re-suspended in the culture solution. Continue oxygenation to maintain saturation of the solution at 100% throughout the process and increase the temperature to between 30° C. and 33° C., preferably 30° C. Continue perfusion of the culture medium and bone marrow cells with perfusion volume between 15 and 75 ml/min (depending on the organ circulation time). Time of culture perfusion and maintenance with cells lasts approximately 4 hours. In some embodiments, the culture perfusion takes between 4 to 6 hours. Package the treated organ in an organ transport bag and deliver, at room temperature, to the operating room for transplant.

The examples described below are presented to describe the preferred aspects of the invention, but do not constitute a limitation to its scope.

Example 1

The electrolytic solution was prepared using the following elements: sodium chloride 0.8766 g (15 mMol); potassium chloride 0.6710 g (9 mMol); monopotassium a-ketoglutaric acid 0.1842 g (1 mMol); hexahydrate magnesium chloride 0.8132 g (4 mMol); L-histidine hydrochloride monohydrate 3.7733 g (18 mMol); L-histidine 27.9289 g (180 mMol); L-tryptophan 0.4085 (2 mMol); mannitol 5.4651 g (30 mMol); dehydrated calcium chloride 0.0022 g (0.015 mMol); in a total volume of 1000 mL.

The wash was prepared with HBSS without phenol red (1×); RPMI without phenol red (1×); glutamate with a concentration of 1-2×; sodium pyruvate with a concentration of 1-2 mM; bovine albumin or peptone with a concentration of 0.125-0.375%; vitamin C at a concentration of 0.25-0.50 mg/ml; N-acetylcysteine at a concentration of 0.04-0.08%; nicotinamide 0.25-0.50 mg/mL; penicillin (at a concentration of 100,000 U/L)/streptomycin (at a concentration of 100,000 μg/L); amphotericin B at a concentration of 750 μg/L (The antibiotic is selected from the group of beta-lactamic antibiotics, aminoglycosides antibiotics, fluoroquinolones antibiotics, or combinations thereof. The antifungal agent is selected from the Polyene, Imidazole, triazole, thiazole, and Echinocandins antifungals, or combinations thereof).

The cultured medium comprises RPMI without phenol red (1×); glutamate with a concentration of 1-2×; sodium pyruvate with a concentration of 1-2 mM; bovine albumin or peptone with a concentration of 0.125-0.375%; vitamin C at a concentration of 0.25-0.50 mg/ml; N-acetylcysteine at a concentration of 0.04-0.08%; nicotinamide 0.25-0.50 mg/mL; penicillin (at a concentration of 100,000 U/L)/streptomycin (at a concentration of 100,000 μg/L); amphotericin B at a concentration of 750 μg/L.

Three transplants were performed of non-vital organs (Trachea), which were chimerized through the organ chimerization process described above, obtaining as outcome 100% acceptance of the organ by the receptor, and total suspension of immunosuppression. Three months after the organ transplant, the patient was removed from all immunosuppressant medication, without presenting—to date—evidence of acute or chronic rejection, without graft disease against the host, or relapse of the original neoplasm after months of monitoring. Electropherograms after five months showed 49.93% chimerization, with 100% five and a half years after the transplant. In addition to this first process, two more chimerization procedures have been conducted on trachea, with similar outcomes.

Although this invention has been described with the preferred embodiments shown, it remains understood that modifications and variations conserving the spirit and reach of this invention are within the scope of the claims attached.

What is claimed is:

1. A method for in-vitro chimerization of an organ for transplantation, consisting of:
    washing the organ for transplant with an electrolytic solution in a container;
    replacing the electrolytic solution with wash media, comprising Hanks' balanced salt solution (HBSS) without phenol red, Roswell Park Memorial Institute (RPMI) 1640 medium without phenol red, glutamate, sodium pyruvate, bovine albumin or peptone, vitamin C, N-acetylcysteine, nicotinamide, penicillin, streptomycin, amphotericin B;
    replacing the wash media with culture media comprising RPMI 1640 medium without phenol red, glutamate, sodium pyruvate, peptone, vitamin C, N-acetylcysteine, nicotinamide, penicillin, streptomycin, amphotericin B;
    adding bone marrow cells obtained from a recipient to the culture media.

2. The method of claim 1, wherein the organ is incubated with the bone marrow cells for four to six hours.

3. The method of claim 1, wherein oxygenation is maintained at 100%.

4. The method of claim 1, wherein the wash and culture media are pumped through the organ at a rate of 15 to 75 ml/min.

5. The method of claim 1, where the container is maintained at a temperature of between 2° C. and 4° C. prior to addition of bone marrow cells.

6. The method of claim 4, wherein the container is maintained at a temperature of 3° C. prior to addition of bone marrow cells.

7. The method of claim 1, wherein the container temperature is raised to between 30° C. and 33° C. once the bone marrow cells are added.

8. The method of claim 7, wherein the temperature is raised to 30° C.

9. The method of claim 1, wherein the culture media comprises:
    RPMI without phenol red, glutamate, sodium pyruvate at a concentration of 1-2 mM, bovine albumin or peptone at a concentration of 0.125-0.375%, vitamin C at a concentration of 0.25-0.50 mg/ml, N-acetylcysteine at a concentration of 0.04-0.08%, nicotinamide at a concentration of 0.25-0.50 at a concentration of mg/mL, penicillin at a concentration of 100,000 U/L, streptomycin at a concentration of 100,000 μg/L, amphotericin B at a concentration of 750 μg/L.

10. A method for in-vitro chimerization for organ transplantation, consisting of:
    washing the organ for transplant with an electrolytic solution;

replacing the electrolytic solution with wash media;
replacing the wash media with culture media comprising RPMI 1640 medium without phenol red, glutamate, sodium pyruvate peptone, a vitamin, N-acetylcysteine, nicotinamide, an antibiotic, and an antifungal agent;
adding bone marrow cells obtained from a receptor to the culture media.

11. The method of claim 10, wherein the vitamin is vitamin C.

12. The method of claim 10, wherein the antibiotic comprises one of a beta lactam, an aminoglycoside, a fluoroquinolone, and/or combinations thereof.

13. The method of claim 10, wherein the antifungal agent is at least one of a polyene, an imidazole, a triazole, a thiazole, an echinocandin, and/or combinations thereof.

14. The method of claim 10, wherein the culture media comprises RPMI 1640 medium without phenol red, glutamate, sodium pyruvate at a concentration of 1-2 mM, bovine albumin or peptone at a concentration of 0.125-0.375%, vitamin C at a concentration of 0.25-0.50 mg/ml, N-acetylcysteine at a concentration of 0.04-0.08%, nicotinamide at a concentration of 0.25-0.50 mg/mL, penicillin at a concentration of 100,000 U/L, streptomycin at a concentration of 100,000 µg/L, amphotericin B at a concentration of 750 µg/L.

15. The method of claim 10, wherein the wash media, comprises:
Hank's balanced salt solution (HBSS) without phenol red, RPMI 1640 medium without phenol red, glutamate, sodium pyruvate, bovine albumin or peptone, a vitamin, an amino acid, an antibiotic, and an antifungal agent.

16. The method of claim 15, wherein the vitamin is selected from the group consisting of vitamin C, nicotinamide, and mixtures thereof.

17. The method of claim 15, wherein the antibiotic comprises at least one of a beta lactam; an aminoglycoside, and a fluoroquinolone, and/or combinations thereof.

18. The method of claim 15, wherein the antifungal agent is at least one of a polyene, an imidazole, a triazole, a thiazole, an echinocandin, and/or combinations thereof.

19. The method of claim 15, wherein the wash media comprises Hank's balanced salt solution (HBSS) without phenol red, RPMI medium without phenol red, glutamate, sodium pyruvate at a concentration of 1-2 mM, bovine albumin or peptone at a concentration of 0.125-0.375%, vitamin C at a concentration of 0.25-0.50 mg/ml, N-acetylcysteine at a concentration of 0.04-0.08%, nicotinamide at a concentration of 0.25-0.50 mg/mL, penicillin at a concentration of 100,000 U/L, streptomycin at a concentration of 100,000 amphotericin B at a concentration of 750 µg/L.

20. The method of claim 10, wherein the wash media comprises Hank's balanced salt solution (HBSS) without phenol red, RPMI 1640 medium without phenol red, glutamate, sodium pyruvate, bovine albumin or peptone, vitamin C, N-acetylcysteine, nicotinamide, penicillin, streptomycin, amphotericin B.

* * * * *